Patented Feb. 22, 1938

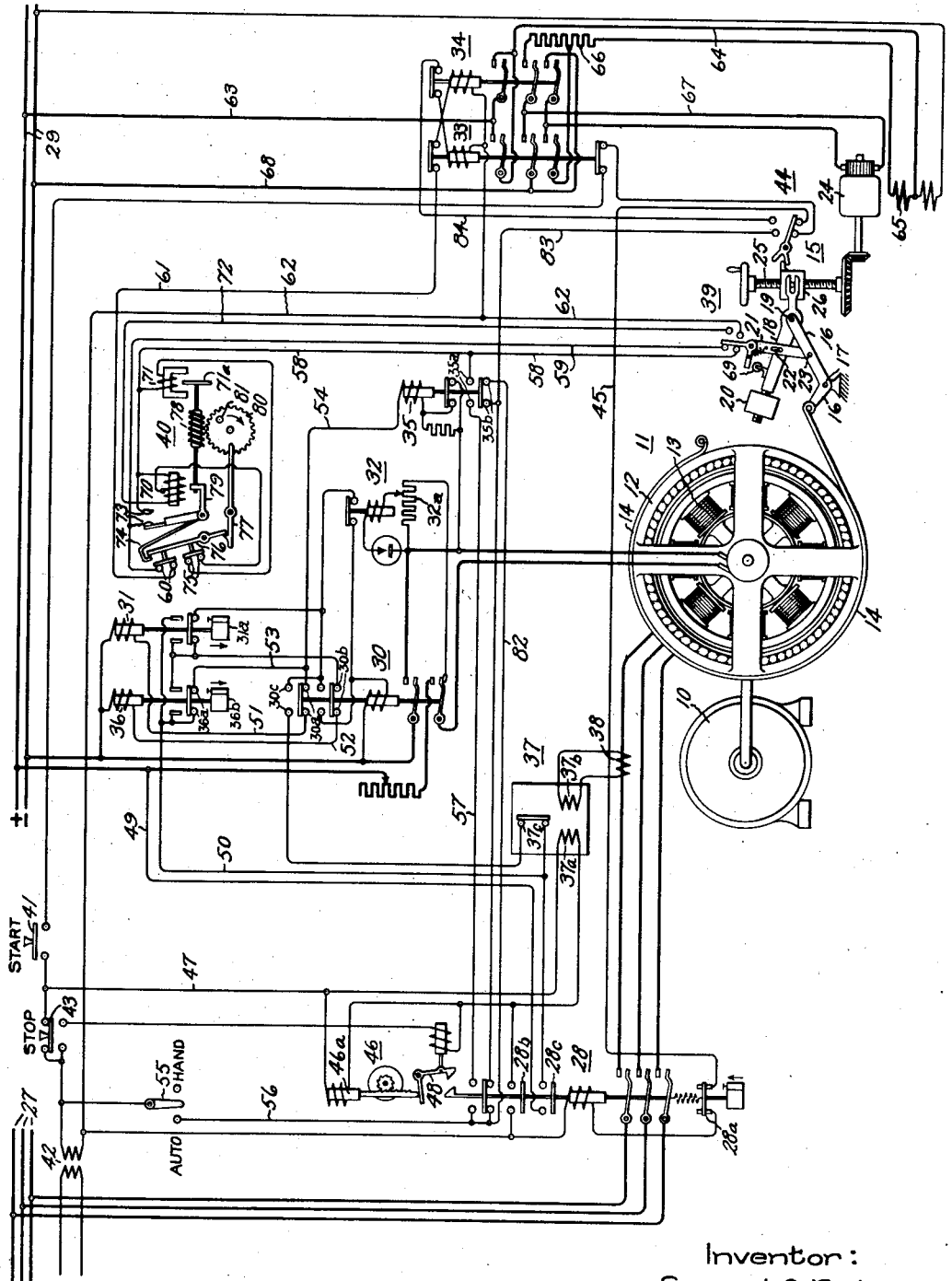

2,109,370

UNITED STATES PATENT OFFICE 2,109,370

MOTOR CONTROL SYSTEM

Samuel C. Ewing, Schenectady, N. Y., assignor to General Electric Company, a corporation of New York Application April 13, 1935, Serial No. 16,192

8 Claims. (Cl. 172—289)

This invention relates to the control of electric motors, and more particularly to control of synchronous motors having rotatable field and armature members, and it has for an object the provision of a simple, reliable, and efficient control of this character.

When the armature member of a motor of this type is first connected to the supply source, the driving member which is connected to the load remains at rest and the stator member begins to rotate. As the stator approaches synchronous speed, the field winding is connected to a supply source and the motor is synchronized. Thereafter, a brake is applied to retard the rotating stator motor and accelerate the driving member and load to full operating speed.

Abnormal operating conditions, such for example as a dip or failure of the alternating current supply voltage, over-load or loss of field, cause a motor of this type to pull out of synchronism. If this occurs, it is usually necessary to interrupt the field connections and to release the brake before attempting to resynchronize the motor. Accordingly, a further object of this invention is the provision of means responsive to an abnormal operating condition for removing the field and releasing the brake to allow the stator to slip and for resynchronizing the motor as the speed of the rotor relative to the stator again approaches synchronous speed, and subsequently tightening up the brake to accelerate the load to synchronous speed.

In carrying the invention into effect in one form thereof, means are provided for responding to an abnormal operating condition of the motor, such as pulling out of step in response to overload, failure of supply voltage or other causes, for removing the field from the motor and causing the brake operating motor to release the brake and allow the stator to slip, together with means for automatically resynchronizing the motor upon termination of the abnormal operating condition and actuating the brake applying motor to tighten up the brake to retard the stator member and again accelerate the driving member to full operating speed.

For a better and more complete understanding of the invention, reference should now be had to the following specification and to the accompanying drawing, the single figure of which is a simple diagrammatic illustration of an embodiment of the invention.

Referring now to the drawing, a load 10, which may be any machine, such for example as a fan or a cement mill, is connected by means of a shaft to the driving member of a synchronous motor 11 having a rotatable armature member 12 and a rotatable field member 13. Either the armature member or the field member may serve as a rotor or driving member, but in the embodiment chosen for illustration, the field member 13 constitutes the driving member and the armature member 12 constitutes the stator. The armature member 12 is provided with a friction brake which is indicated as a band 14 encircling the outer periphery of the armature member 12. Although a band brake is illustrated, it will be understood that the invention is not limited to this type of brake, since other well-known types of brake may be utilized if desired.

For the purpose of applying and releasing the brake, suitable actuating mechanism 15 and a lever mechanism through which the actuating means controls the tightening and releasing of the brake band 14, are provided. One end of the brake band 14 is secured to the foundation or bed-plate of the machine by any suitable fastening means (not shown) and the opposite end, that is to say the loose end of the band, is secured to the lever mechanism so that the band may be tightened or released by the actuating means 15.

As shown, the slack end of the band 14 is secured to one end of a lever 16 which is mounted for pivotal movement about a fulcrum 17. At the opposite end of the lever 16 is secured a lever 18 for pivotal movement about a pivot pin 19. The lever 18 is provided at one end with a screw thread upon which a weight 20 is threaded. This threaded connection between the lever and the weight provides ready adjustment of the position of the weight with respect to the lever fulcrum. A link 21 provided with a slot 22 is pivoted by a pin 23 to the lever arm 16 at a point intermediate the pin 17 and the pin 19. The lever arm 18 carries a pin which projects through and works in the slot 22 thereby providing for limited rotative movement of the lever 18 about its pivot 19. Normally, the pin on the lever arm 18 rests at the lower extremity of the slot 22, which serves as a lower limit for the lever 18.

The brake actuating mechanism 15 is illustrated as comprising an auxiliary motor 24, a screw 25 driven by the motor 24 through suitable gearing, and a nut 26 in threaded engagement with the screw 25. The nut 26 is provided with a pin which works in the slot of a bifurcated member on the extremity of the lever arm 18.

Electric power is supplied to the armature member of the synchronous motor 11 from a suitable source of alternating voltage represented by the three supply lines 27 to which the terminals of the armature winding are arranged to be connected by means of a suitable electromagnetic switching device or line contactor 28. Similarly, direct current power is supplied to the field member 13 from a suitable source of direct current voltage represented by the plus and minus supply lines 29, to which the terminals of the field winding are arranged to be connected by means of a suitable electromagnetic switching device or field applying contactor 30.

Suitable means, illustrated as a time delay relay 31, are provided for interposing a time delay between the operation of the line contactor 28 and the closing of the field applying contactor 30. Means are also provided for preventing the closing operation of the field applying contactor 30 until the speed of the stator member of the synchronous motor relative to the rotor motor very closely approximates synchronous speed. For example, these means may be designed to prevent application of the field to the synchronous motor until the speed of the stator relative to the rotor is approximately 95% of synchronous speed. These means are illustrated as embodied in an electroresponsive device 32 having contacts in the energizing circuit of the field applying contactor 30. The device 32 responds to the slip frequency voltage induced in the field circuit of the synchronous motor when the armature of the motor is connected to the alternating current supply source 27, to open the energizing circuit of the field applying contactor 30 and to maintain it open until the frequency of this voltage has decreased to a value corresponding to approximately 95% of synchronous speed. Although a slip frequency voltage responsive relay is shown in the illustrated embodiment for controlling the field contactor 30, it will be understood that other well-known types of devices for responding to a predetermined operating condition of the motor may be utilized if preferred.

Although the brake applying motor 24 may be any suitable type of motor, it is illustrated as a series wound direct current motor arranged to be supplied from any suitable source of direct current, which may be and preferably is the same source 29 as that from which the field winding of the synchronous motor is supplied. This motor is arranged to be connected to the direct current supply source 29 by means of suitable reversing switching mechanism illustrated as electromagnetic contactors 33 and 34. When the contactor 34 is closed, the pilot motor 24 is energized for rotation in a direction to apply the brake to the stator of the synchronous motor, whereas when the contactor 33 is energized and closed the motor 24 is energized for rotation in a direction to release the brake.

These contactors 33 and 34 are controlled by suitable means illustrated as a control relay 35. When this control relay is energized and operated to its upper closed position, the brake applying contactor 34 is energized and closed and conversely when the control relay is de-energized and in the lower open position in which it is illustrated, provision is made for energizing the brake release contactor 33. A suitable time delay device 36, illustrated as a time delay relay is provided for interposing a time interval between the closing of the field contactor 30 and the energization of the control relay 35 to effect application of the brake to the stator of the synchronous motor.

In order to effect field removal from the synchronous motor and release of the brake upon the occurrence of an abnormal operating condition, suitable protective means 37 are provided for exercising a further measure of control over the control relay 35. The protective device 37 is illustrated as a power factor relay which is provided with a voltage coil 37a, current coil 37b connected to the secondary winding 38 of a current transformer in the connections to the armature winding of the synchronous motor, and normally closed contacts 37c in the energizing circuit of the field applying contactor 30. However, many other types of suitable protective devices for responding to varied abnormal operating conditions of the synchronous motor are available and any of these devices may be utilized instead of a power factor relay if preferred.

Suitable limit switch mechanism is provided for de-energizing the brake applying motor 24 at both the fully applied and fully released positions of the brake applying mechanism. However, in order to cinch up the brake, a suitable time delay device 40 is provided for maintaining the brake applying motor 24 energized for a suitable time interval after the brake actuating mechanism has been operated to the fully applied position.

With the above understanding of the elements and their organization in the completed system, the operation of the system itself will readily be understood from the following detailed description:

It is assumed that the system is in the de-energized condition in which it is illustrated with the brake band 14 fully released so that the stator member of the synchronous motor is free to rotate. To initiate the motor starting cycle, the start button 41 is depressed to its closed position. This completes an energizing circuit for the operating coil of the line contactor 28, which circuit is readily traced from the upper terminal of the secondary winding of the control transformer 42, through the normally closed contacts of stop button 43, closed contacts of start button 41, normally closed contacts of brake release contactor 33, normally closed contacts of the brake release limit switch 44, conductor 45, normally closed time delay contact 28a of the line contactor 28, operating coil of the said contactor and thence to the lower side of the secondary winding of the transformer 42. Contactor 28 is operated to its upper position in response to energization, and its main contacts connect the terminals of the armature winding of the synchronous motor to the supply source 27. As is usual in synchronous motors, the synchronous motor 11 is provided with a squirrel cage winding (not shown) for starting purposes. Since the rotor member, in this case the field member 13, is connected to the load 10 and since the brake 14 is released the stator member 12 begins to rotate.

It will be observed that a resistance 32a is connected across the terminals of the field circuit of the synchronous motor through the normally closed contact of the field applying contactor 30 and that the operating coil of slip frequency relay 32 is connected across this resistance. When the line contactor 28 closes to apply alternating voltage to the armature winding, a voltage of slip frequency is induced in the field winding of the synchronous motor. At standstill, of course, the slip is 100% and therefore the frequency of the induced voltage is the same as the line frequency. The relay 32 responds to this induced slip frequency voltage to open its contact and thereby interrupt the energizing circuit of the field applying contactor 30. An energizing circuit is also completed for the coil of the latching device 46. This circuit is traced from the upper transformer terminal through the stop button 43, conductor 47, operating coil of latching device 46, auxiliary interlock contacts bridged by intermediate movable contact member 28b and thence to the lower terminal of the transformer. In response to energization, the operating coil of the latching device withdraws the plunger 46a from engagement with the latch hook 48 thus allowing the latter to rotate in a clockwise direction to latch the contactor 28 in the closed position.

The closing of the line contactor 28 also establishes an energizing circuit for the operating coil of time delay relay 31. This circuit is traced from the positive side of the supply source 29, through conductor 49, lower stationary interlock contacts of the line contactor bridged by the movable contact member 28c, conductor 50, normally closed contacts 36a of time delay device 36, normally closed contacts 30a of field contactor 30, conductor 51, operating coil of time delay relay 31, to the lower side of the supply source 29. In response to energization, the relay 31 opens its lower stationary contact and closes its upper stationary contact to complete an energizing circuit for the operating coil of time delay relay 36, which circuit is traced from the positive side of the supply source to the conductor 50 as before, thence through upper contacts of relay 31, lower normally closed contacts 30b of field contactor 30, conductor 52, operating coil of relay 36 and thence to the negative side of the supply source 29. The relay 36, in responding to energization, opens its lower stationary contacts and closes its upper stationary contacts to complete a holding circuit for its operating coil independent of the upper contacts of relay 31. The opening of the lower contacts 36a of relay 36 interrupts the energizing circuit of the relay 31, which was previously traced through these contacts, thereby de-energizing relay 31 and allowing it to open its upper contact and to reclose its lower contact after the expiration of a time interval determined by the setting of the time delay device 31a which time interval is preferably of the order of one second. This time delay is interposed for the purpose of giving slip frequency relay 32 enough time to pick up and open its contacts so as to prevent energization and operation of the field contactor 30 at this time.

When the speed of the stator is approximately 95% synchronous speed, the induced slip frequency voltage in the field circuit of the synchronous motor is reduced sufficiently to allow the slip frequency relay 32 to close its contacts thereby to complete an energizing circuit of the operating coil of the field contactor 30. This circuit extends from the positive side of the supply source 29 to the conductor 50 as previously traced, thence through the upper contacts of the time delay relay 36, lower contacts of relay 31, contacts of slip frequency relay 32, operating coil of field contactor 30 to the lower side of the supply source.

Field relay 30 closes its main contacts in response to energization to connect the field winding of the synchronous motor to the supply source 29. The application of field to the synchronous motor 11 produces a synchronizing torque which causes the field structure to become synchronized with the rotating magnetic field of the armature member. In the closed position of the field contactor 30, the upper and lower movable contacts complete a holding circuit for the operating coil of the field contactor independent of the contacts of the time relays 31 and 36. This holding circuit is traced from the positive supply line 29 through the lower interlocks of the line contactor bridged by movable contact member 28c, stationary contacts 37c of power factor relay 37 bridged by movable contact member, upper stationary contacts 30c and intermediate stationary contacts bridged by upper and lower auxiliary movable contacts of contactor 30, and operating coil thereof to the negative side of the supply source. In addition, the lower auxiliary contact of contactor 30 opens the energizing circuit of the time relay 36 at the stationary contacts 30b, thereby to de-energize the time relay 36.

After a predetermined interval of time, determined by the setting of the time delay device 36b the movable contact member of relay 36 is disengaged from the upper stationary contact and descends into engagement with the lower stationary contact to complete an energizing circuit for the energizing coil of control relay 35, which circuit is readily traced from the positive side of the supply source 29 to the conductor 50 as before, thence through lower stationary contacts of relay 36, conductors 53 and 54, operating coil of control relay 35, and thence through upper contacts of field contactor 30 to the lower side of the supply source 29. It will also be observed that in the closed position of the contactor 30, the energizing circuit of the time relay 31 is opened at the stationary contact 30a which prevents re-energization of the operating coil of the time relay 31 when the movable contact of time relay 36 descends into engagement with stationary contact 36a.

In responding to energization, control relay 35 is operated to its upper position in which its lower movable contact bridges stationary contact 35a to complete an energizing circuit for the operating coil of the brake applying contactor 34. This circuit extends from the upper terminal of transformer 42 through switch 55 in the left hand position (for automatic operation) thereof, conductor 56, upper auxiliary contact of the line contactor 28, bridged by movable contact member, conductor 57, stationary contact 35a of control relay bridged by lower movable contact member, conductor 58, left hand stationary contacts of limit switch 39 bridged by movable contact member, conductor 59, contact 60 of time delay device 48, conductor 61, upper interlocking contacts of brake release of contactor 33, operating coil of contactor 34, and thence by conductor 62 to the lower terminal of the transformer. The contactor 34 closes in response to energization and connects the auxiliary motor 24 to the supply source 29. The connections are traced from the positive side of the supply source through conductor 63, upper main contact of contactor 34, conductor 64, series field 65, resistance 66, intermediate main contacts of contactor 34, conductor 67, armature of motor 24, lower main contacts of contactor 34 and thence by conductor 68 to the lower side of supply source 29.

Owing to the full amount of the resistance 66 in series with motor 24, the latter rotates at low speed in a direction such as to actuate the brake actuating mechanism to tighten up the brake band 14.

After a few revolutions of the auxiliary motor 24, the nut 26 on the screw 25 actuates the movable contact member of the limit switch 44 out of engagement with the lower stationary contact and into engagement with the upper stationary contacts, partially to complete an energizing circuit for the operating coil of the brake release contactor 33, which circuit, however, still remains open at the lower contacts 35b of the control relay 35 and at the interlock contacts of the contactor 34.

As the brake band 14 is tightened, the stator of the synchronous motor 11 is retarded and the rotor and load 10 are accelerated to full speed. When the brake actuating mechanism reaches the fully applied position, the roller 69 on the lever arm 18 of the brake actuating mechanism snaps the movable contact member of the limit switch 39 out of engagement with its left hand stationary contact members and into engagement with its right hand stationary contact members. This completes an energizing circuit for the magnet 70 of the time delay device 40 and for the stator winding of the driving motor 71 of this device. The magnet winding circuit is traced from the upper terminal of the transformer 42 to the conductor 58 as before, thence through the magnet winding 70, conductor 72, right hand contacts of limit switch 39 and thence by conductor 62 to the lower terminal of the transformer. The magnet 70 closes contacts 73 to bridge the left hand stationary contacts of limit switch 39 thereby re-establishing the energizing circuit for the operating coil of the contactor 34, which was interrupted when the limit switch 39 was actuated from its left hand to its right hand position. The magnet 70 also places the hook member 74 under tension tending to open the contacts 60 and 75. This, however, is prevented because the movable contact carrying member 76 is retained in the closed position by means of the latch 77.

It will be observed that the winding 71 of the timer motor is connected in parallel with one half of the winding of the magnet 70 through the contact 75. Consequently, the timer motor is energized, as a result of which the rotor 71a begins to rotate the worm 78.

When magnet 70 was energized, the worm bearing member 79 was rotated in a clockwise direction about its pivot to lower the worm 78 into engagement with gear wheel 80. Rotation of the worm 78 causes the gear wheel 80 to rotate in a clockwise direction as indicated by the arrow.

During the time that the time delay relay 40 is operating, the brake applying motor 24 remains energized even though the brake actuating mechanism has already been operated to its fully applied position. This continued energization of the brake applying motor cinches up the brake tightly so as to prevent any slippage. After a predetermined interval of time, preferably of the order of three or four seconds, the pin 81 on the gear wheel 80 strikes the latch 77, thereby unlatching the contact carrying member 76 and allowing the hook 74, which is tensioned by the magnet 70, to rotate the contact carrier 76 and open the contacts 60 and 75. As a result of the opening of these contacts, the timer motor 71 is de-energized and the energizing circuit for the contactor 34 is interrupted. This causes the contactor 34 to open and de-energize the auxiliary motor 24.

Since the stator member of the synchronous motor 11 is now at rest, the motor drives the load 10 at synchronous speed. This synchronous operation will continue as long as no abnormal operating conditions are encountered.

However, if any abnormal operating condition should arise, such for example as a dip or failure of alternating current voltage, loss of direct current field, or over-load sufficient to pull the synchronous motor out of synchronism, the power factor will immediately decrease as is well understood. This will cause the power factor relay 37 to open its contact 37c thereby interrupting the holding circuit for the field contactor 30 previously traced through these contacts. The field contactor 30 will immediately open its contacts to remove field from the synchronous motor 11, and if the slip frequency of the induced voltage in the field circuit is high enough at this point, the slip frequency relay 32 will open its contacts. Since the energizing circuit of the control relay 35 is traced through the upper main contacts of the field contactor 30, the opening of the latter will de-energize the control relay thereby allowing its lower movable contact member to descend into engagement with lower stationary contacts 35b to establish an energizing circuit for the brake release contactor 33, which is traced from the upper terminal of the transformer 42 through conductor 56, conductor 82, contact 35b of control relay 35, conductor 83, upper contacts of limit switch 44, bridged by movable contact member, conductor 84, closed interlocks of brake apply contact 34, operating coil of brake release contactor 33 and thence by conductor 62 to the lower terminal of the transformer. The disengagement of the lower movable contact member of the control relay 35 from stationary contact 35a opens the magnet circuit 70 of the timer 40 allowing the latter to return to its reset position as illustrated in the drawing.

Contactor 33 closes in response to energization and connects the motor 24 to the supply source 29 for direction in the reverse rotation. This causes the brake mechanism 15 to slack off on the brake band 14 and allow the stator member 12 to slip. During this reverse rotation, only half of the resistance 66 is in series with the motor 24 and consequently the slacking off operation of the brake band 14 proceeds at a more rapid rate than the tightening up operation.

In the lower open position of the field contactor 30, the energizing circuit for the time relay 31 is reestablished through the stationary contact 30a and the previously described timing cycles of the time relays 31 and 36 is repeated. When the abnormal operating condition which initiated the field removal and brake release disappears, and the relative speed of the stator and rotor members of the synchronous motor 11 again approaches synchronous speed, the frequency relay 32 will again close its contacts to complete an energizing circuit for the field contactor 30, causing the latter to close and re-apply the field and thus resynchronize the motor 11.

When the brake operating mechanism was actuated to slack off the brake band, the roller 69 moved out of engagement with the movable contact member of limit switch mechanism 39 allowing the spring to snap the movable contact member back into engagement with the left hand stationary contact members, thereby leaving the control circuit for the magnet 70 and motor 71 of the timer 40 in a reset condition.

Field contactor 30 in reclosing completes an energizing circuit for the operating coil of the control relay 35, as a result of which the brake applying operation is repeated in the manner heretofore described. The brake band 14 is again tightened and the rotor of the synchronous motor 11 and its load 10 are again accelerated to synchronous speed. This condition endures until some abnormal operating condition causes the field to be removed from the synchronous motor and the synchronizing operation to be repeated, or until the stop button 43 is depressed to de-energize the entire system to restore it to the inactive condition in which it is illustrated.

Although in accordance with the provisions of the patent statutes, this invention is described as embodied in concrete form, it will be understood that the apparatus and connections shown are merely illustrative and the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. In combination, an electric driving motor having rotatable field and armature members, one of said members constituting a driving member, a brake for the other of said members, means for establishing power connections for said field and armature members, an auxiliary motor for applying said brake, and means responsive to an abnormal operating condition of said driving motor for interrupting said field connections and controlling said auxiliary motor to release said brake and responsive to termination of said abnormal condition for re-establishing said field connections and controlling said auxiliary motor to re-apply said brake.

2. In combination, an electric driving motor having rotatable field and armature members, one of said members constituting a load driving member, a brake for the other of said members, means for establishing power connections for said field and armature members, means for controlling the application of said brake comprising an auxiliary motor and reversing switching means for controlling the direction of rotation of said auxiliary motor, means responsive to an abnormal operating condition of said driving motor for interrupting said field power connections and for actuating said reversing switching means to control said auxiliary motor to release said brake, and means responsive to termination of said abnormal operating condition for re-establishing said field connections and actuating said reversing switching means to control said auxiliary motor to reapply said brake.

3. A control system for an alternating current synchronous motor having rotatable field and armature members, one of said members constituting a driving member, comprising a brake for the other of said members, means for establishing power connections for said field and armature members, means for applying and releasing said brake comprising an auxiliary motor and a pair of directional switches therefor, a time element device for delaying energization of said auxiliary motor a predetermined interval of time after establishment of said field connections, means responsive to said driving motor pulling out of step for interrupting said field connections and actuating said directional switches to control said auxiliary motor to release said brake, and means for resynchronizing said motor and re-applying said brake.

4. A control system for an alternating current synchronous motor having rotatable field and armature members, one of said members constituting a driving member, comprising a brake for the other of said members, means for establishing power connections for said field and armature members, means for applying said brake, means for actuating said brake applying means to apply said brake a predetermined interval of time after establishment of said field connections, means responsive to a pull out condition of said motor for interrupting said field connections, means responsive to interruption of said connections for actuating said applying means to release said brake, and means responsive to termination of said pull out condition for resynchronizing said motor and actuating said applying means to re-apply said brake.

5. A control system comprising an alternating current synchronous motor having rotatable field and armature members, one of said members being connected to drive a load, a brake for the other of said members, a pilot motor for applying and releasing said brake, means for establishing connections for said armature to a source of alternating voltage, means controlled by the speed of said synchronous motor for establishing power connections for said field member to a source of direct current, means responsive to establishment of said field connections for energizing said pilot motor to apply said brake, means responsive to a pull out condition of said synchronous motor for interrupting said field connections and energizing said pilot motor to release said brake, and means controlled by interruption of said field connections for co-operating with said speed controlled means to re-establish said field connections and energize said pilot motor to re-apply said brake.

6. A control system comprising an alternating current synchronous motor having rotatable field and armature members, one of said members being connected to drive a load, a brake for the other of said motors, an auxiliary motor for applying and releasing said brake, means for establishing connections for said armature member to a source of alternating voltage, an electric responsive device responsive to the induced slip frequency voltage of said field for establishing connections for said field to a source of direct current, a time delay device actuated in response to establishment of said field connections and a control relay controlled thereby for energizing said auxiliary motor to apply said brake a predetermined interval of time after establishment of said field connections, a power factor relay responsive to pull out condition of said synchronous motor for interrupting said field connections and de-energizing said control relay thereby to energize said auxiliary motor to release said brake, and means responsive to interruption of said field connections for co-operating with said electroresponsive device to re-establish said field connections and energize said auxiliary motor to re-apply said brake upon termination of said pull out condition.

7. A control system comprising in combination, an alternating current synchronous motor having rotatable field and armature members, one of said members constituting a driving member, a brake for the other of said members, an auxiliary motor for applying said brake, means for re-establishing connections from said armature member to a source of alternating voltage, a relay responsive to the induced slip frequency voltage of the field of said synchronous motor and a switching device controlled thereby for establishing power connections for said field member, a control relay controlled by establishment of said field connections for energizing said auxiliary motor to apply said brake, limit switch mechanism for preparing a control circuit for reverse rotation of said auxiliary motor, means responsive to pull out condition of said synchronous motor for interrupting said field connections and de-energizing said control relay to stop said auxiliary motor, contact means controlled by said control relay and co-operating with said limit switch to energize said auxiliary motor for reverse rotation to release said brake, and means controlled by interruption of said field connections and co-operating with said slip frequency voltage responsive relay for re-establishing said field connections and energizing said auxiliary motor to re-apply said brake.

8. A control system comprising in combination an alternating current synchronous motor having rotatable field and armature members, one of said members being connected to drive a load, a brake for the other of said members, an auxiliary motor connected to said brake, a switching device for energizing said auxiliary motor to apply said brake, a second switching device for energizing said auxiliary motor to release said brake, means for establishing power connections for said armature member, means responsive to an operating condition of the field circuit of said synchronous motor for establishing power connections for said field member, a control relay responsive to establishment of said field connections for completing an energizing circuit for said switching device to energize said auxiliary motor to apply said brake, limit switch mechanism actuated by rotation of said auxiliary motor for partially completing an energizing circuit for said second switching device, means responsive to pull out condition of said synchronous motor for interrupting said field connections and actuating said control relay to complete the energizing circuit for said second switching device to effect release of said brake, and means controlled by interruption of said field connections for co-operating with said field circuit responsive means for re-establishing said field connections and re-applying said brake.

SAMUEL C. EWING.